(12) United States Patent (10) Patent No.: US 8,909,061 B1
Varadarajan (45) Date of Patent: Dec. 9, 2014

(54) CHROMATIC DISPERSION PRE-COMPENSATION

(75) Inventor: Badri Varadarajan, Mountain View, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 98 days.

(21) Appl. No.: 13/461,847

(22) Filed: May 2, 2012

Related U.S. Application Data

(63) Continuation-in-part of application No. 13/413,705, filed on Mar. 7, 2012, now Pat. No. 8,792,789.

(51) Int. Cl.
*H04B 10/00* (2013.01)
*H04B 10/04* (2006.01)
*H04B 10/12* (2006.01)
*H04B 10/06* (2006.01)

(52) U.S. Cl.
USPC .......................... 398/159; 398/193; 398/210

(58) Field of Classification Search
USPC ............. 398/16, 29, 147, 158, 193, 195, 208, 398/209
See application file for complete search history.

(56) References Cited

U.S. PATENT DOCUMENTS

| 2004/0197103 | A1* | 10/2004 | Roberts et al. | 398/159 |
| 2005/0195893 | A1* | 9/2005 | Brunn et al. | 375/232 |
| 2010/0054750 | A1* | 3/2010 | Forgheri et al. | 398/136 |
| 2011/0206382 | A1* | 8/2011 | Elselt | 398/159 |
| 2011/0280582 | A1* | 11/2011 | Piehler | 398/117 |
| 2012/0063532 | A1* | 3/2012 | Yoshimoto et al. | 375/285 |

* cited by examiner

*Primary Examiner* — David Payne
*Assistant Examiner* — Casey Kretzer
(74) *Attorney, Agent, or Firm* — Amin, Turocy & Watson, LLP

(57) ABSTRACT

A method is provided for performing chromatic dispersion (CD) pre-compensation. The method generates an electronic signal at a transmitter, and uses a transmit CD compensation estimate to compute a CD pre-compensation filter. The transmit CD pre-compensation filter is used to process the electronic signal, generating a pre-compensated electronic signal. The pre-compensated electronic signal is converted into an optical signal and transmitted to an optical receiver via an optical channel. In one aspect, the transmitter generates a test electronic signal and the CD compensation estimate uses a first dispersion value to compute a first CD compensation filter. The transmitter accepts a residual dispersion estimate of the test optical signal from the first optical receiver CD compensation filter, generated from a (receiver-side) CD estimate, and then the transmit CD estimate can be modified in response to the combination of the first dispersion value and residual dispersion estimate.

13 Claims, 14 Drawing Sheets

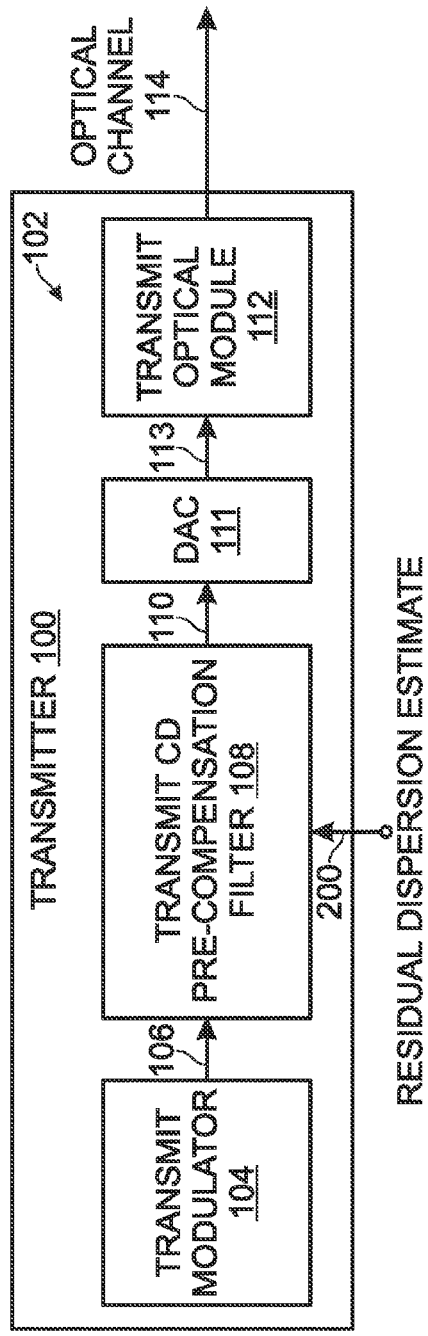
Fig. 2
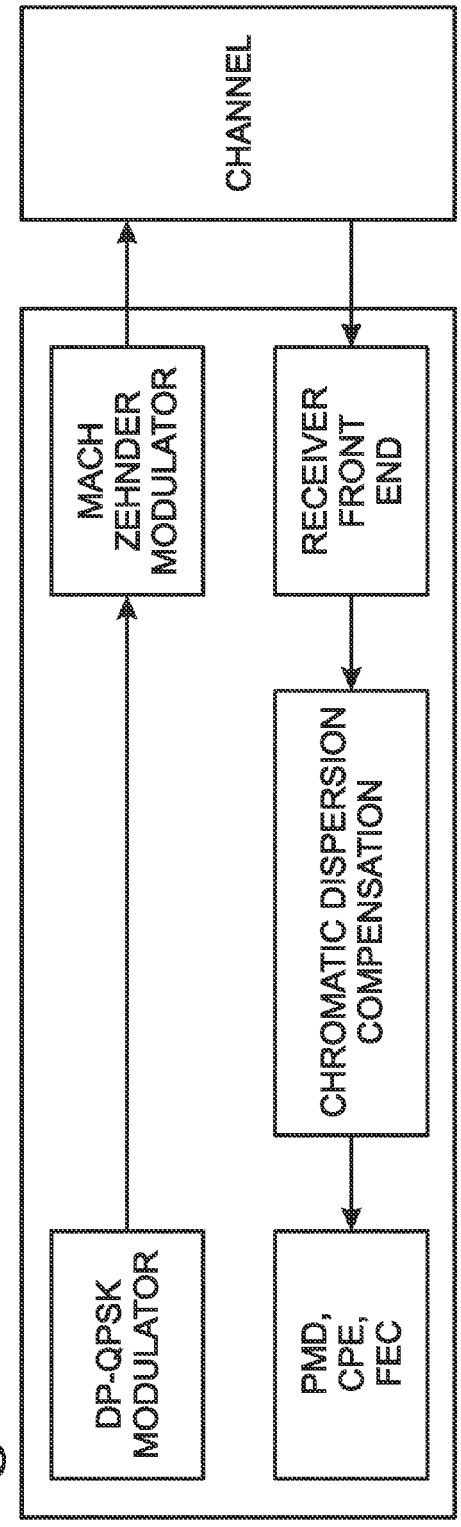
Fig. 5A *(PRIOR ART)*

Fig. 9

| | TEST | FIXED PARAMETERS | VARIABLE | MEASUREMENT | RESULT |
|---|---|---|---|---|---|
| 1 | PRE-COMPENSATION LENGTH REQUIRED | | VARY FIBER LENGTH | PLOT FILTER REQUIRED, MEASURE EFFECTIVE FILTER LENGTH | NEED 13 TAPS FOR 500 km NEED 639 TAPS FOR 5000 km |
| 2 | ATTENUATION & PAPR REQUIRED | FIX LENGTH = 100 km PMD OFF, NON-LINEARITY OFF, Rx LASER LOCKED TO Tx LASER INFINITE-BIT DAC | ATTENUATION & CLIPPING THRESHOLD OF DAC OUTPUT | SNR AT RECEIVER | NEEDS 0.5V rms, ~10 dB PAR |
| 3 | DAC ACCURACY | FIX LENGTH = 100 km PMD OFF, NON-LINEARITY OFF, Rx LASER LOCKED TO Tx LASER 0.5V RMS, 10 dB PAR | NUMBER OF DAC BITS | SNR AT RECEIVER | 6-BIT DAC SUFFICIENT |
| 4 | RECEIVE EFFECTIVE CHANNEL AFTER PRE-EQUALIZATION | FIX LENGTH = 4000 km PMD OFF, NON-LINEARITY OFF, Rx LASER LOCKED TO Tx LASER | VARY FIBER LENGTH | PLOT EFFECTIVE CHANNEL | Tx PRE-DISTORTION REMOVES MOST CHROMATIC DISPERSION, NEED XX dBm PER CHANNEL TO ACHIEVE 13 dB SNR AT 4000 km |

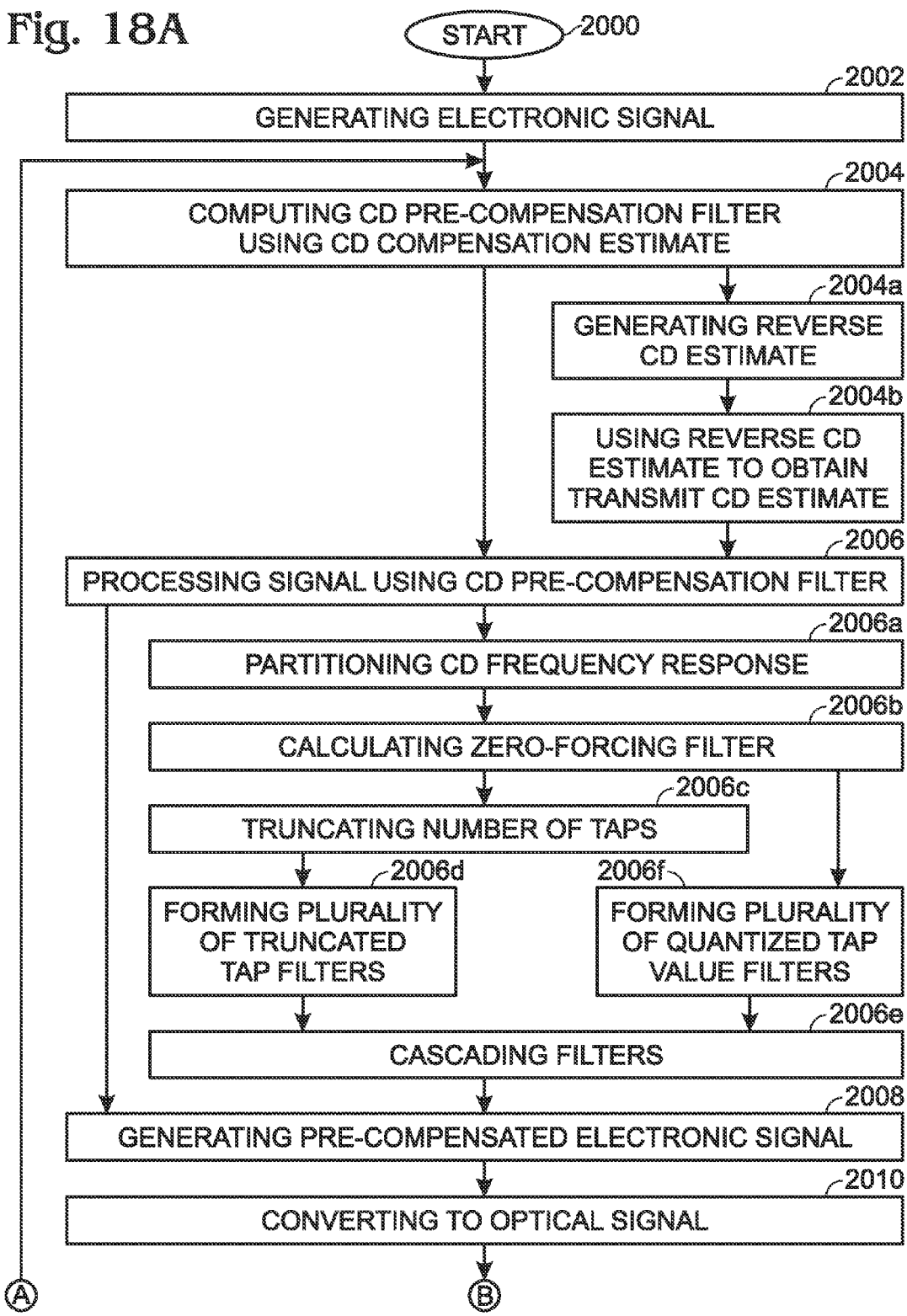

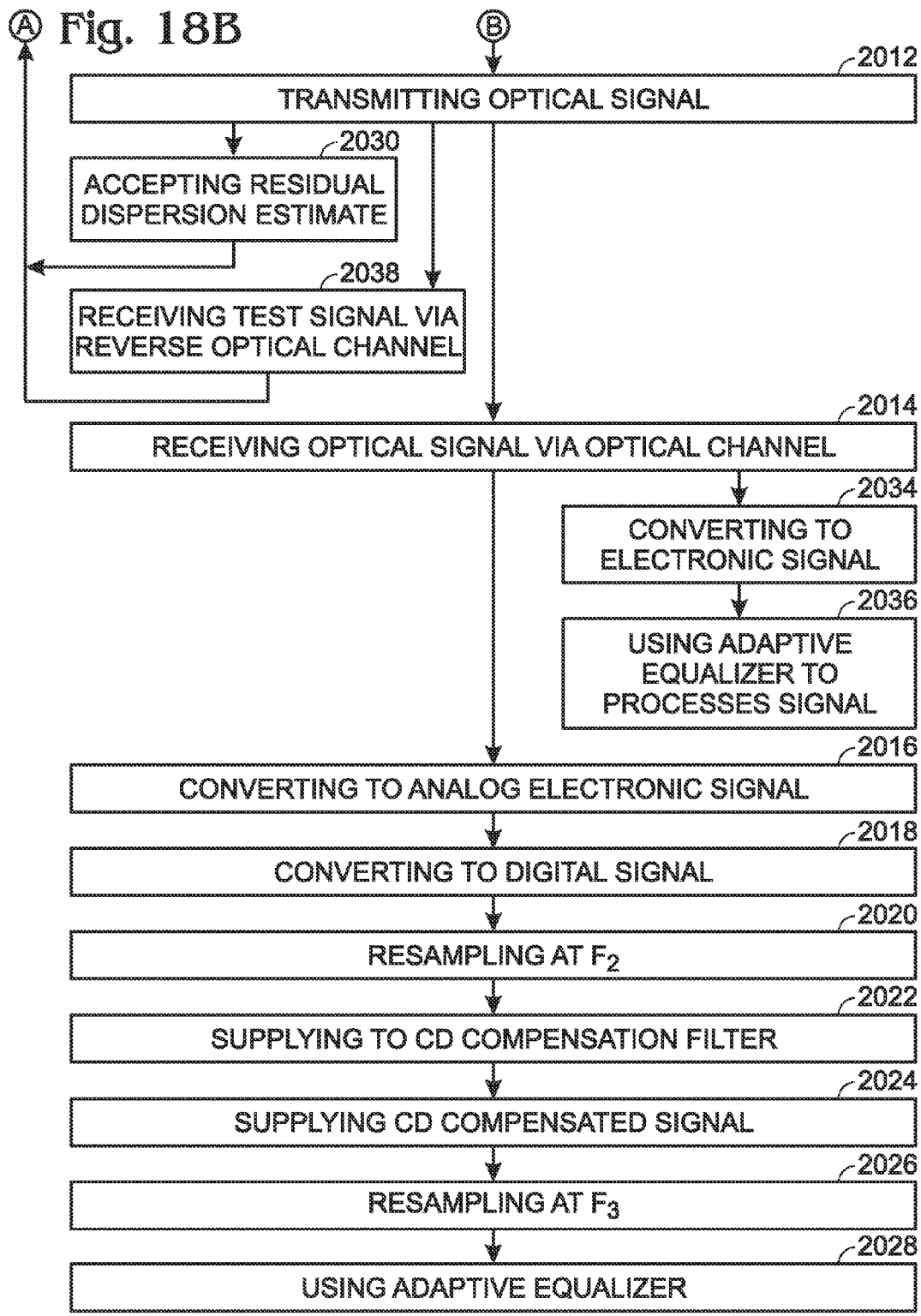

CHROMATIC DISPERSION PRE-COMPENSATION

RELATED APPLICATIONS

This application is a Continuation-in-Part of a pending application entitled, OPTIMIZED CHROMATIC DISPERSION FILTER, invented by Badri Varadarajan et al., Ser. No. 13/413,705, filed Mar. 7, 2012, which is incorporated herein by reference.

BACKGROUND OF THE INVENTION

1. Field of the Invention

This invention generally relates to optical communications and, more particularly, to a transmitter filter that pre-compensates for the effects of chromatic dispersion in an optical communications channel.

2. Description of the Related Art

Wikipedia notes that in optics, dispersion is the phenomenon in which the phase velocity of a wave depends on its frequency, or alternatively when the group velocity depends on the frequency. Media having such a property are termed dispersive media. Dispersion is sometimes called chromatic dispersion to emphasize its wavelength-dependent nature, or group-velocity dispersion (GVD) to emphasize the role of the group velocity.

The most familiar example of dispersion is probably a rainbow, in which dispersion causes the spatial separation of a white light into components of different wavelengths (different colors). However, dispersion also has an effect in many other circumstances: for example, GVD causes pulses to spread in optical fibers, degrading signals over long distances; also, a cancellation between group-velocity dispersion and nonlinear effects leads to soliton waves.

There are generally two sources of dispersion: material dispersion and waveguide dispersion. Material dispersion comes from a frequency-dependent response of a material to waves. For example, material dispersion leads to undesired chromatic aberration in a lens or the separation of colors in a prism. Waveguide dispersion occurs when the speed of a wave in a waveguide (such as an optical fiber) depends on its frequency for geometric reasons, independent of any frequency dependence of the materials from which it is constructed. More generally, "waveguide" dispersion can occur for waves propagating through any inhomogeneous structure (e.g., a photonic crystal), whether or not the waves are confined to some region. In general, both types of dispersion may be present, although they are not strictly additive. Their combination leads to signal degradation in optical fibers for telecommunications, because the varying delay in arrival time between different components of a signal "smears out" the signal in time.

The phase velocity, v, of a wave in a given uniform medium is given by $$v = \frac{c}{n}$$

where c is the speed of light in a vacuum and n is the refractive index of the medium.

In general, the refractive index is some function of the frequency f of the light, thus $n=n(f)$, or alternatively, with respect to the wave's wavelength $n=n(\lambda)$. The wavelength dependence of a material's refractive index is usually quantified by its Abbe number or its coefficients in an empirical formula such as the Cauchy or Sellmeier equations.

Because of the Kramers-Kronig relations, the wavelength dependence of the real part of the refractive index is related to the material absorption, described by the imaginary part of the refractive index (also called the extinction coefficient). In particular, for non-magnetic materials ($\mu=\mu_0$), the susceptibility x that appears in the Kramers-Kronig relations is the electric susceptibility $X_e=n^2-1$.

Since that refractive index varies with wavelength, it follows that the angle by which the light is refracted will also vary with wavelength, causing an angular separation of the colors known as angular dispersion.

For visible light, refraction indices n of most transparent materials (e.g., air, glasses) decrease with increasing wavelength $\lambda$:

$1 < n(\lambda_{red}) < n(\lambda_{yellow}) < n(\lambda_{blue})$ or alternatively:

$$\frac{dn}{d\lambda} < 0.$$

In this case, the medium is said to have normal dispersion. Whereas, if the index increases with increasing wavelength (which is typically the case for X-rays), the medium is said to have anomalous dispersion.

At the interface of such a material with air or vacuum (index of ~1), Snell's law predicts that light incident at an angle $\theta$ to the normal will be refracted at an angle arcsin(sin $(\theta)/n$). Thus, blue light, with a higher refractive index, will be bent more strongly than red light, resulting in the well-known rainbow pattern.

Another consequence of dispersion manifests itself as a temporal effect. The formula $v=c/n$ calculates the phase velocity of a wave; this is the velocity at which the phase of any one frequency component of the wave will propagate. This is not the same as the group velocity of the wave, which is the rate at which changes in amplitude (known as the envelope of the wave) will propagate. For a homogeneous medium, the group velocity $v_g$ is related to the phase velocity by (here $\lambda$ is the wavelength in vacuum, not in the medium):

$$v_g = c\left(n - \lambda\frac{dn}{d\lambda}\right)^{-1}.$$

The group velocity $v_g$ is often thought of as the velocity at which energy or information is conveyed along the wave. In most cases this is true, and the group velocity can be thought of as the signal velocity of the waveform. In some unusual circumstances, called cases of anomalous dispersion, the rate of change of the index of refraction with respect to the wavelength changes sign, in which case it is possible for the group velocity to exceed the speed of light ($v_g>c$). Anomalous dispersion occurs, for instance, where the wavelength of the light is close to an absorption resonance of the medium. When the dispersion is anomalous, however, group velocity is no longer an indicator of signal velocity. Instead, a signal travels at the speed of the wavefront, which is c irrespective of the index of refraction.

The group velocity itself is usually a function of the wave's frequency. This results in group velocity dispersion (GVD), which causes a short pulse of light to spread in time as a result of different frequency components of the pulse travelling at different velocities. GVD is often quantified as the group delay dispersion parameter (again, this formula is for a uniform medium only):

$$D = -\frac{\lambda}{c}\frac{d^2 n}{d\lambda^2}.$$

If D is less than zero, the medium is said to have positive dispersion. If D is greater than zero, the medium has negative dispersion. If a light pulse is propagated through a normally dispersive medium, the result is the higher frequency components travel slower than the lower frequency components. The pulse therefore becomes positively chirped, or up-chirped, increasing in frequency with time. Conversely, if a pulse travels through an anomalously dispersive medium, high frequency components travel faster than the lower ones, and the pulse becomes negatively chirped, or down-chirped, decreasing in frequency with time.

The result of GVD, whether negative or positive, is ultimately temporal spreading of the pulse. Equivalently, GVD constitutes a linear channel whose frequency response can be closely approximated as $$H_{CD}(w) = \exp\left(-j\frac{D\lambda^2}{4\pi c}L(w-w_s)^2\right),$$

where w represents the angular frequency, $w_s$ is the center frequency of the band of interest, c is the speed of light, and L is the length of the fiber travelled by the communication signal. Note that in time domain, the above channel response has significant length, implying that a single impulse entering the fiber is dispersed broadly over time.

This makes dispersion management extremely important in optical communications systems based on optical fiber, since if dispersion is too high, a group of pulses representing a bit-stream will spread in time and merge together, rendering the bit-stream unintelligible. This phenomenon limits the length of fiber that a signal can be sent down without regeneration. One possible answer to this problem is to send signals down the optical fiber at a wavelength where the GVD is zero (e.g., around 1.3-1.5 µm in silica fibers), so pulses at this wavelength suffer minimal spreading from dispersion—in practice, however, this approach causes more problems than it solves because zero GVD unacceptably amplifies other non-linear effects (such as four wave mixing). Instead, the solution that is currently used in practice is to perform dispersion compensation, typically by matching the fiber with another fiber of opposite-sign dispersion so that the dispersion effects cancel; such compensation is ultimately limited by nonlinear effects such as self-phase modulation, which interact with dispersion to make it very difficult to undo. Note that this method of compensation is performed optically, by using dispersion compensating fiber.

A third method is to perform dispersion compensation in the electronic domain. Since the dispersion is equivalently represented by a filter, it can be compensated by filtering at the transmitter or receiver. In order to enable such electronic dispersion compensation, communication is coherent, i.e., the optical front end preserves magnitude and phase information, which are both used by the electronics to perform dispersion compensation filtering.

In addition to chromatic dispersion, optical fibers also exhibit model dispersion caused by a waveguide (i.e. optical fiber) having multiple modes at a given frequency, each with a different speed. A special case of this is polarization mode dispersion (PMD), which comes from a superposition of two modes that travel at different speeds due to random imperfections that break the symmetry of the waveguide.

When a broad range of frequencies (a broad bandwidth) is present in a single wavepacket, such as in an ultrashort pulse or a chirped pulse or other forms of spread spectrum transmission, it may not be accurate to approximate the dispersion by a constant over the entire bandwidth, and more complex calculations are required to compute effects such as pulse spreading.

In particular, the dispersion parameter D defined above is obtained from only one derivative of the group velocity. Higher derivatives are known as higher-order dispersion. These terms are simply a Taylor series expansion of the dispersion relation $\beta(\omega)$ of the medium or waveguide around some particular frequency. Their effects can be computed via numerical evaluation of Fourier transforms of the waveform, via integration of higher-order slowly varying envelope approximations, by a split-step method (which can use the exact dispersion relation rather than a Taylor series), or by direct simulation of the full Maxwell's equations rather than an approximate envelope equation.

Coherent receivers perform both chromatic dispersion compensation using digital signal processing (DSP) of the analog-to-digital (ADC) output. Since long haul systems have large chromatic dispersion, the processing is complex and power-hungry.

It would be advantageous if pre-compensation could be performed in a transmitter, to minimize the effects of chromatic dispersion in signals received via an optical channel.

SUMMARY OF THE INVENTION

Accordingly, a method is provided for performing chromatic dispersion (CD) pre-compensation. The method generates a first electronic signal at a transmitter, and uses a transmit CD compensation estimate to compute a CD pre-compensation filter. The transmit CD pre-compensation filter is used to process the first electronic signal, generating a pre-compensated first electronic signal. The pre-compensated first electronic signal is converted into an optical signal and transmitted to a first optical receiver via an optical channel. In one aspect, an optical receiver accepts the optical signal via the optical channel at the first optical receiver, converts the optical signal into an analog electronic signal, and then converts the analog electronic signal to a digital signal at an initial sampling frequency $F_1$. The digital signal can be resampled at a sampling frequency $F_2$, lower in frequency than $F_1$ and supplied to a CD compensation filter. The CD compensated signal can be resampled at a sampling frequency $F_3$, greater than or equal to the $F_2$ sampling frequency for processing by an adaptive equalizer.

In another aspect, the transmitter generates a test electronic signal and the CD compensation estimate uses a first dispersion value to compute a first CD compensation filter. The transmitter accepts a residual dispersion estimate of the test optical signal from the first optical receiver CD compensation filter, generated from a (receiver-side) CD estimate, and then the transmit CD estimate can be modified in response to the combination of the first dispersion value and residual dispersion estimate.

Additional details of the above-described method, and a transmitter with a system for performing CD pre-compensation, are presented below.

BRIEF DESCRIPTION OF THE DRAWINGS

FIG. 2 is a schematic block diagram depicting a variation of the system of FIG. 1 with an adjustable CD pre-compensation filter.

FIG. 9 is a chart listing some results from tests performed using the simulation set up of FIGS. 8 and 10.

FIG. 18 is a flowchart illustrating a method for performing CD pre-compensation.

DETAILED DESCRIPTION

Figure 1:
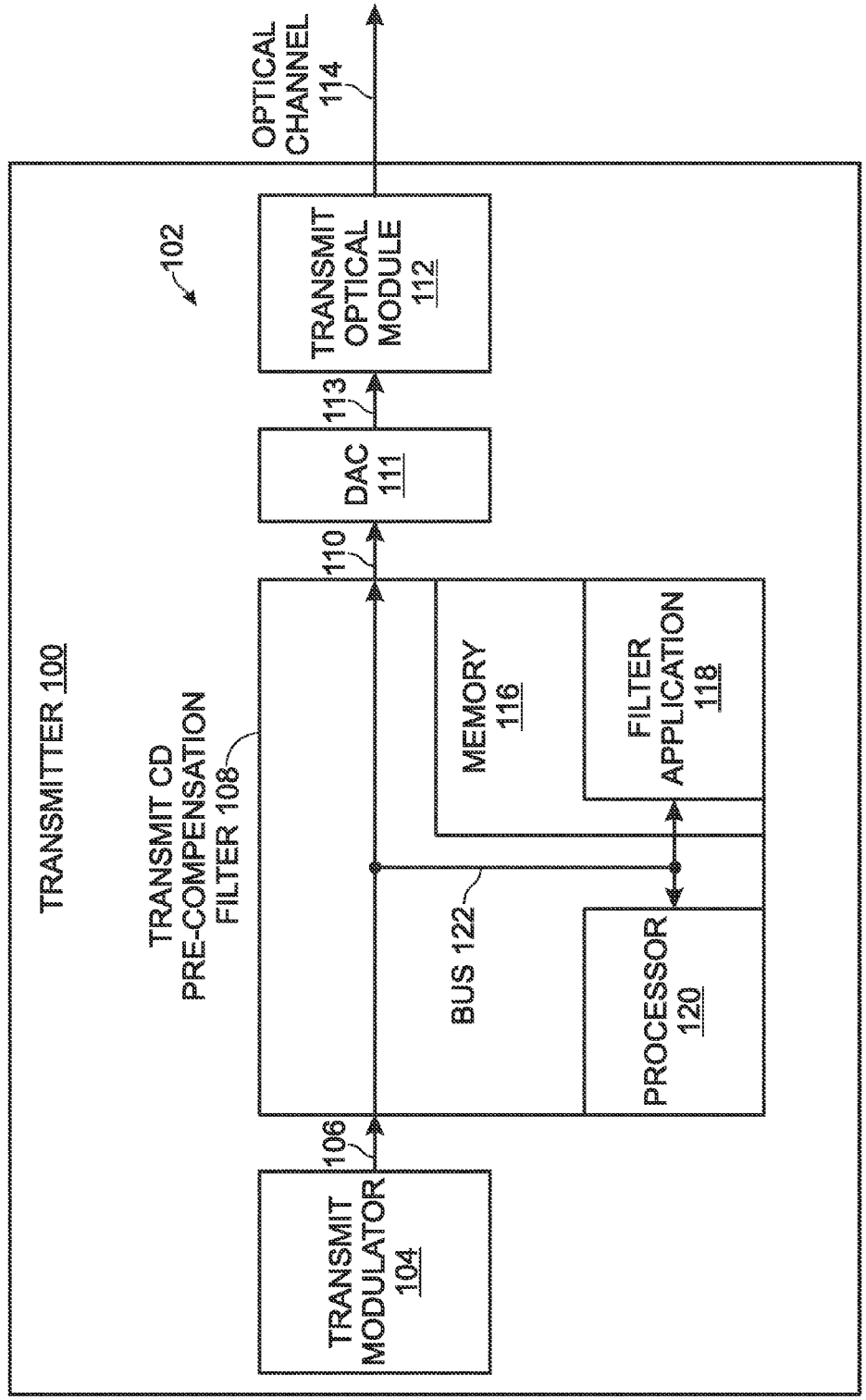
FIG. 1 is a schematic block diagram of a first optical transmitter with a system for performing chromatic dispersion (CD) pre-compensation.

FIG. 1 is a schematic block diagram of a first optical transmitter 100 with a system for performing chromatic dispersion (CD) pre-compensation. The system 102 comprises a transmit modulator 104 having an output on line 106 to supply a first electronic signal. A transmit CD pre-compensation filter 108, built from a CD compensation estimate, has an input on line 106 to accept the first electronic signal. The transmit CD pre-compensation filter 108 processes the first electronic signal and supplies a pre-compensated first electronic signal at an output on line 110. A transmit optical module 112 has an input to accept the pre-compensated first electronic signal and an output for transmitting the optical signal to a first optical receiver (not shown) via an optical channel 114. In one aspect, the transmit optical module 112 is a Mach-Zehnder modulator, and a digital-to-analog converter 111 (DAC) is interposed between the transmit CD pre-compensation filter 108 and the Mach Zehnder modulator 112.

The channel 114 may include the combined effects of the optical fiber, erbium doped fiber amplifiers (EDFAs), and optical filters (not shown).

As used in this application, the terms "component," "module," "system," and the like may refer to an automated computing system entity, such as hardware, firmware, a combination of hardware and software, software, software stored on a computer-readable medium, or software in execution. For example, a system may be, but is not limited to being, a process running on a processor, a processor, an object, an executable, a thread of execution, a program, and/or a computer. By way of illustration, both an application running on a computing device and the computing device can be a system. One or more systems can reside within a process and/or thread of execution and a system may be localized on one computer and/or distributed between two or more computers. In addition, these components can execute from various computer readable media having various data structures stored thereon. The components may communicate by way of local and/or remote processes.

The CD pre-compensation filter 108 may employ a computer system with a bus 122 or other communication mechanism for communicating information, and a processor 120 (e.g., a processor customized to perform only filtering calculations) coupled to the bus for processing information. The CD pre-compensation filter may also include a memory 116, such as a random access memory (RAM) or other dynamic storage device, coupled to the bus 122 for storing information and instructions to be executed by a processor. These memories may also be referred to as a computer-readable medium. The execution of the sequences of instructions contained in a computer-readable medium may cause a processor to perform some of the steps associated with pre-compensation for CD in an optical communications channel. Alternately, these functions, or some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The means of controlling the CD pre-compensation filter processor 120 may be a filter software application 118 stored in the memory 116. The filter application 118 may be enabled as a software application of sequential instructions stored in the memory 116 and executed by the processor 120. As such, the taps may be processor executed instructions. Alternately but not shown in this figure, the CD compensation filter may be completely or partially enabled in hardware as a state machine type logic module (e.g., a field programmable gate array (FPGA)) or dedicated hardware application-specific integrated circuit (ASIC). As such, the taps may be implemented in hardware.

FIG. 2 is a schematic block diagram depicting a variation of the system of FIG. 1 with an adjustable CD pre-compensation filter. The transmit modulator 104 supplies a test electronic signal. The test signal may be a predetermined signal that is known by an optical receiver in communication with the transmitter 100, or a simple non-predetermined signal. The transmit CD pre-compensation filter 108 uses a first dispersion value as the CD compensation estimate and supplies a test electronic signal compensated with the first dispersion value. The transmit optical module 112 transmits a test optical signal to the first optical receiver. Subsequently, the transmit CD pre-compensation filter 108 receives a residual dispersion estimate on line 200 from the first optical receiver and modifies the CD compensation estimate in response to the combination of the first dispersion value and residual dispersion estimate.

The residual compensation estimate may be supplied to the transmit CD pre-compensation filter via a non-optical (e.g., electrical) channel. Alternatively, the residual compensation estimate may be received in the form of an optical signal from the first optical by a second optical receiver that transfers the information to the transmitter.

Figure 3:
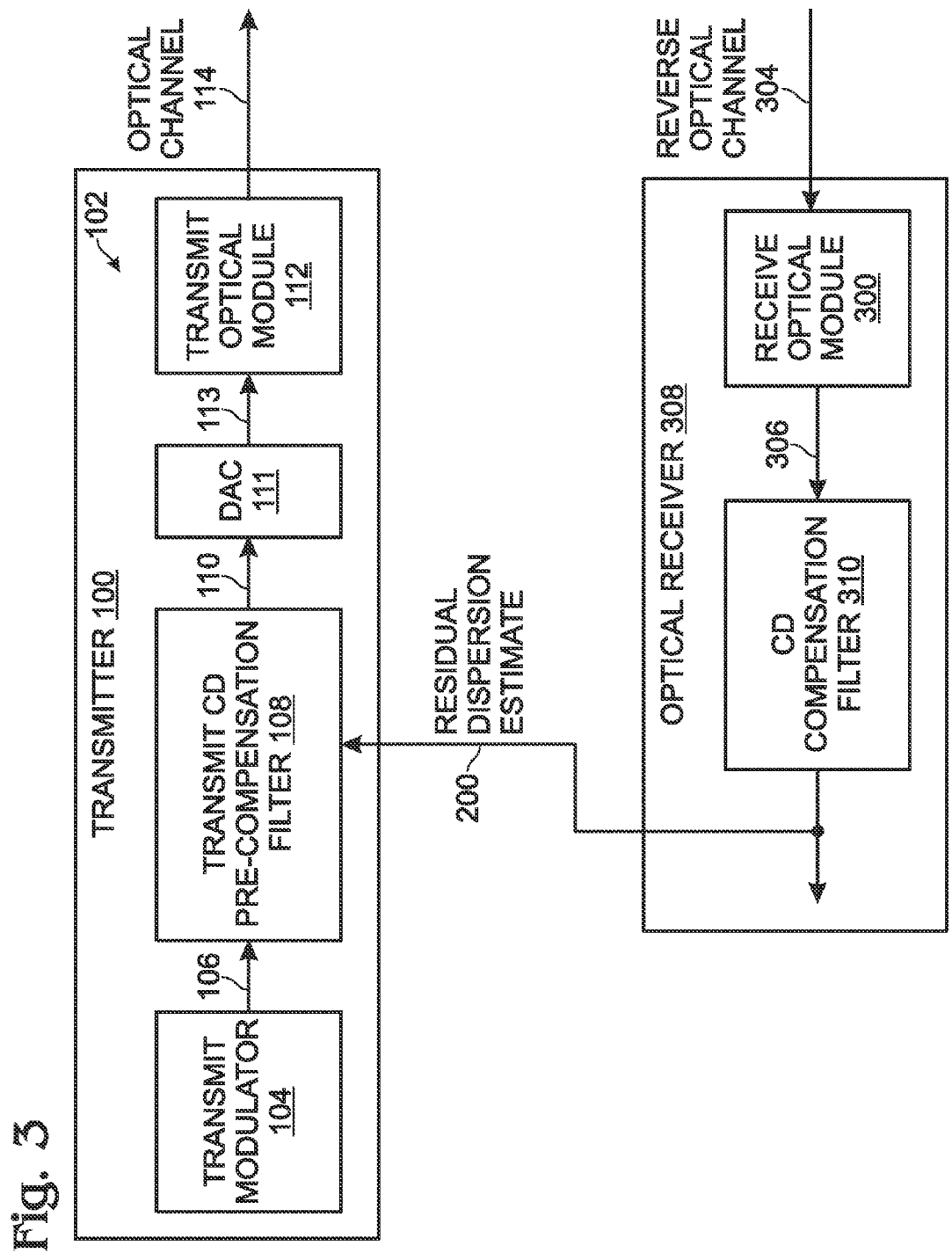
FIG. 3 is a schematic block diagram depicting a second variation of the adjustable CD pre-compensation filter.

FIG. 3 is a schematic block diagram depicting a second variation of the adjustable CD pre-compensation filter. In this aspect, a second optical receiver 308 with a receive optical module 300 accepts a test optical signal from a second optical transmitter (not shown) via a reverse optical channel 304. The receive optical module 300 has an output to supply a received test electronic signal on line 306. A receiver CD compensation filter 310 accepts the received test electronic signal on line 306, and supplies a reverse CD estimate for the reverse optical channel via an output on line 200. Then, the transmit CD pre-compensation filter 108 can be built or modified using a CD estimate responsive to the reverse CD estimate.

Referencing any of FIG. 1, 2, or 3, the transmit CD pre-compensation filter is built from a CD estimate that calculates a zero-forcing filter with a number of taps (n) required to nullify an estimated CD frequency response of the optical channel 114. The transmit CD compensation filter may be built from a finite quantization set filter mechanism, or a filter mechanism that uses a truncated number of taps (n–x), where x is an integer greater than 0. Additional details of the above-mentioned filter mechanism are provided in parent application, OPTIMIZED CHROMATIC DISPERSION FILTER, invented by Badri Varadarajan et al., Ser. No. 13/413,705.

In one aspect of the truncated number of taps method, the transmit CD pre-compensation filter 108 is built using a CD compensation estimate that partitions the chromatic dispersion frequency response of the optical channel 114 into a plurality of constituent chromatic dispersion responses, calculates a zero-forcing filter corresponding to each of the plurality of constituent chromatic dispersion responses, and truncates the number of taps in each of the plurality of zero-forcing filters. A CD pre-compensation filter is formed for each of the plurality of truncated tap zero-forcing filters, and the plurality of CD pre-compensation filters is cascaded.

In one aspect of the quantization set filter mechanism, the transmit CD pre-compensation filter 108 is built using a CD compensation estimate that partitions the chromatic dispersion frequency response of the optical channel 114 into a plurality of constituent chromatic dispersion responses, calculates a zero-forcing filter corresponding to each of the plurality of constituent chromatic dispersion responses, forms a CD pre-compensation filter using the quantized set of tap values for each of the plurality of zero-forcing filters, and cascades the plurality of CD pre-compensation filters.

Figure 4:
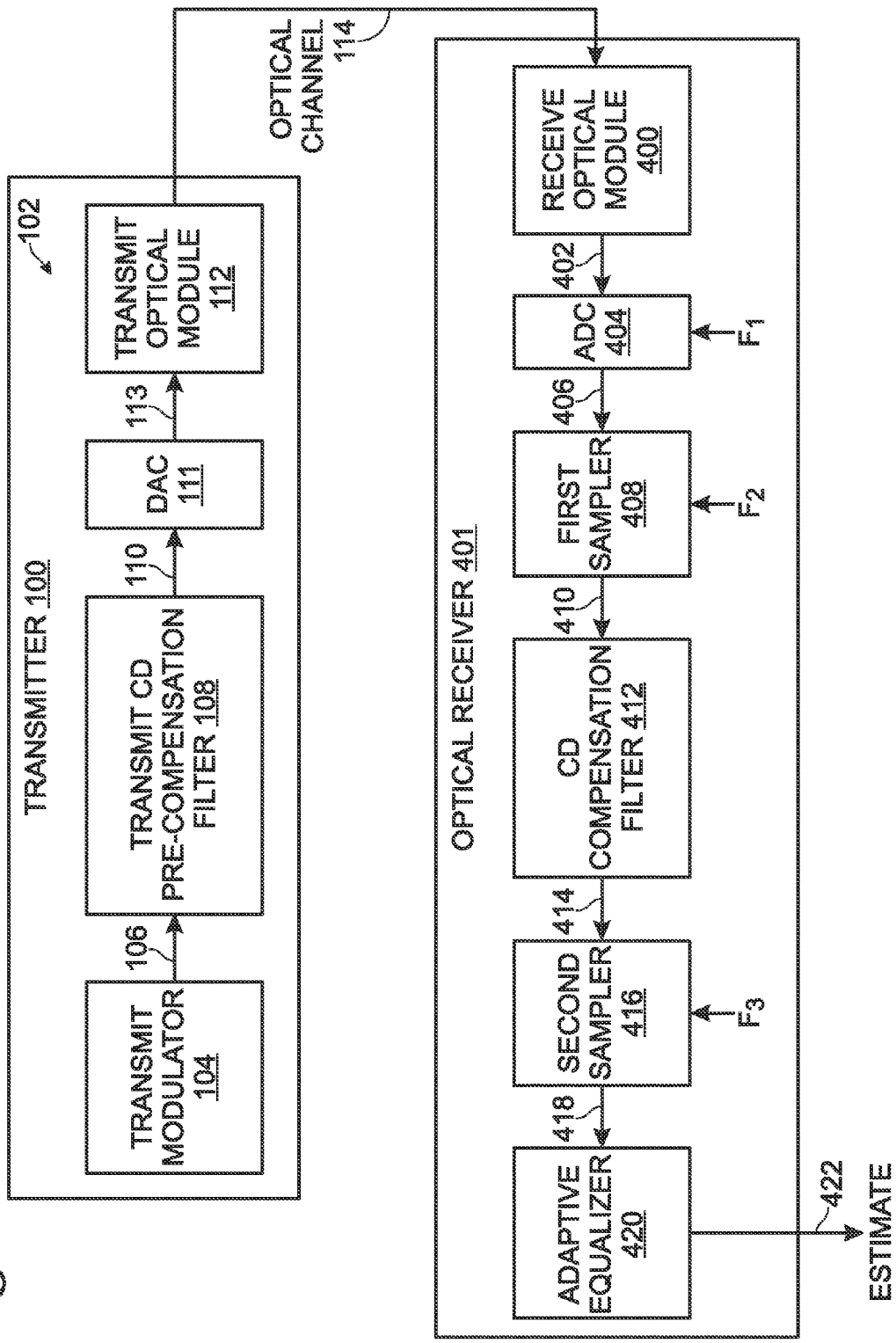
FIG. 4 is a schematic block diagram of an optical network with a system for performing CD pre-compensation.

FIG. 4 is a schematic block diagram of an optical network with a system for performing CD pre-compensation. The system 400 comprises an optical transmitter 100. The transmitter 100 comprises a transmit modulator 104 having an output on line 106 to supply a first electronic signal. A transmit CD pre-compensation filter 108, built from a CD compensation estimate, has an input on line 106 to accept the first electronic signal. The transmit CD pre-compensation filter 108 processes the first electronic signal and supplies a pre-compensated first electronic signal at an output on line 110. A transmit optical module 112 has an input on line 110 to accept the pre-compensated first electronic signal and an output for transmitting the optical signal to a first optical receiver 116 via an optical channel 114.

The optical receiver 401 comprises a receive optical module 400 having an input to accept the optical signal on line 114 and an output on line 402 to supply an analog electronic signal converted from the optical signal. An analog-to-digital converter (ADC) 404 has an input on line 402 to accept the analog electronic signal and an output on line 406 to supply a digital signal at an initial sampling frequency $F_1$. A first sampler 408 has an input on line 406 to accept the digital signal and an output on line 410 to supply the digital signal resampled at a sampling frequency $F_2$, lower in frequency than $F_1$. A CD compensation filter 412 has an input on line 410 to accept the digital signal resampled at sampling frequency $F_2$, and an output on line 414 to supply a CD compensated signal at the $F_2$ sampling frequency. A second sampler 416 has an input on line 414 to accept the CD compensated signal and an output on line 418 to supply a CD compensated input signal resampled at a sampling frequency $F_3$, greater than or equal to the $F_2$ sampling frequency. An adaptive equalizer 420 has an input on line 418 to accept the CD compensated signal resampled at the sampling frequency $F_3$, and an output on line 422 to supply an estimate of the first electronic signal.

Figure 5B:
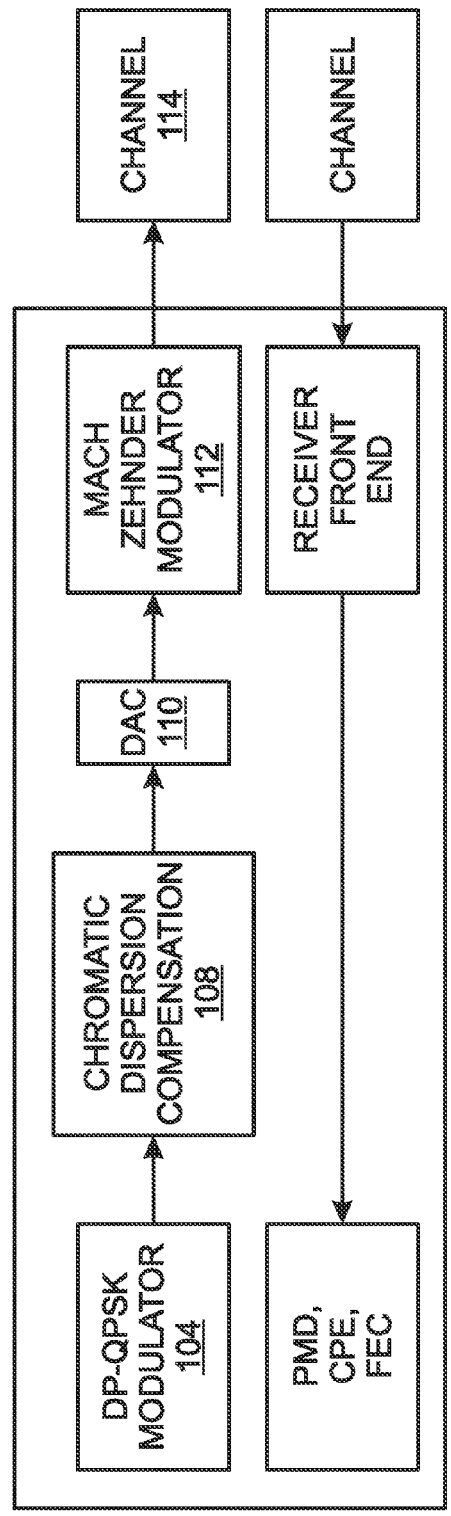
FIGS. 5A (prior art) and 5B are schematic block diagrams contrasting, respectively, a conventional optical transceiver with a transceiver using a transmit CD pre-compensation filter.

FIGS. 5A (prior art) and 5B are schematic block diagrams contrasting, respectively, a conventional optical transceiver with a transceiver using a transmit CD pre-compensation filter. As shown, the CD compensation function has been moved from the receiver to the transmitter. Although the design of FIG. 5B requires the use of a DAC in the transmitter, and feedback or other adaptive technique to tune the transmit CD pre-compensation filter for optimum results, these disadvantages are more than offset by power savings and reduced processing in the receiver. For example, the CD compensation filter of FIG. 5A may oversample at a rate of 1.5×. With 301 taps, at 42 gigahertz and a channel length of 2000 kilometers, such a unit would consume a substantial amount of power at 22 nanometers (nm). Subsequent to the CD compensation filter, polarization mode dispersion (PMD), carrier phase tracking (CPE), and forward error correction (FEC) decoding may be performed. In contrast, the CD pre-compensation filter of FIG. 5B can be sampled at 1×, using almost half the power.

Figure 6:
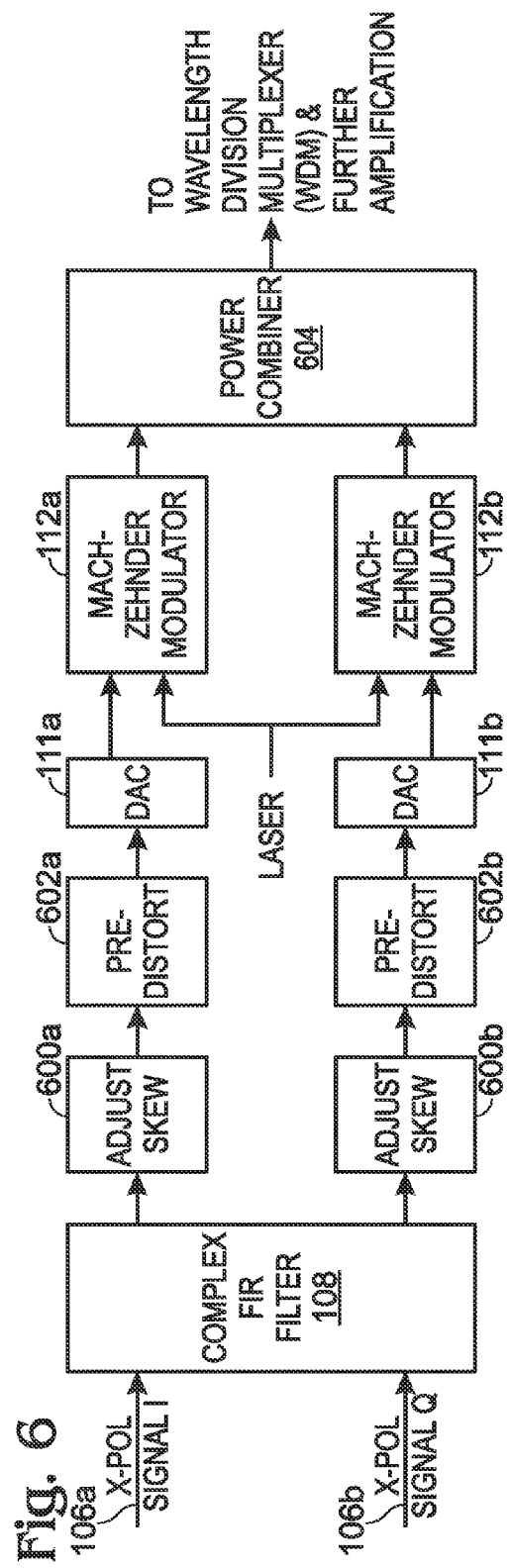
FIG. 6 is a diagram depicting portions of the transmitter of FIG. 5B in greater detail.

FIG. 6 is a diagram depicting portions of the transmitter of FIG. 5B in greater detail. If the first electronic (I/Q) signal on lines 106a and 106b is QPSK, then the CD pre-compensation filter 108 need not perform any multiplication. Since the filter 108 is an all-pass filter, there is no noise enhancement. However, the signal peak-to-average is increased. As is conventional in a transmitter, skew may be adjusted by modules 600a and 600b. To limit distortion in the Mach-Zehnder modulator, the signal swing through the chain is kept small. Higher optical amplification may be used to bring the signal back to desired levels.

Figure 7A:
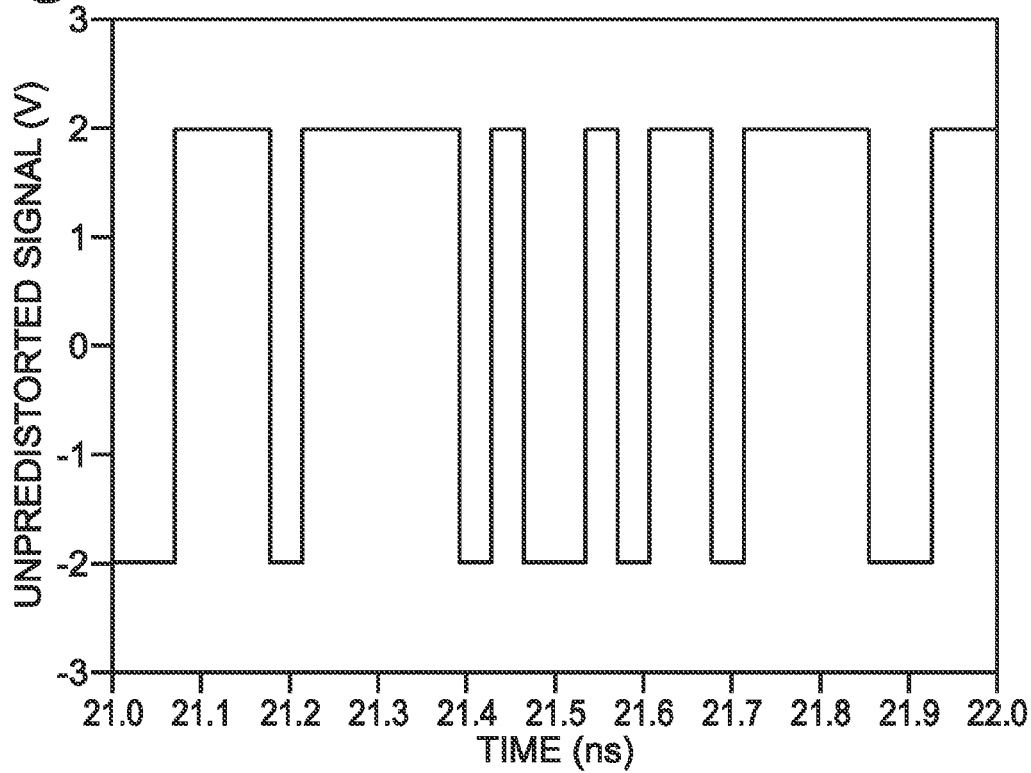
FIGS. 7A and 7B are graphs, respectively, of electrical signals before CD pre-compensation and after DAC conversion.
Figure 7B:
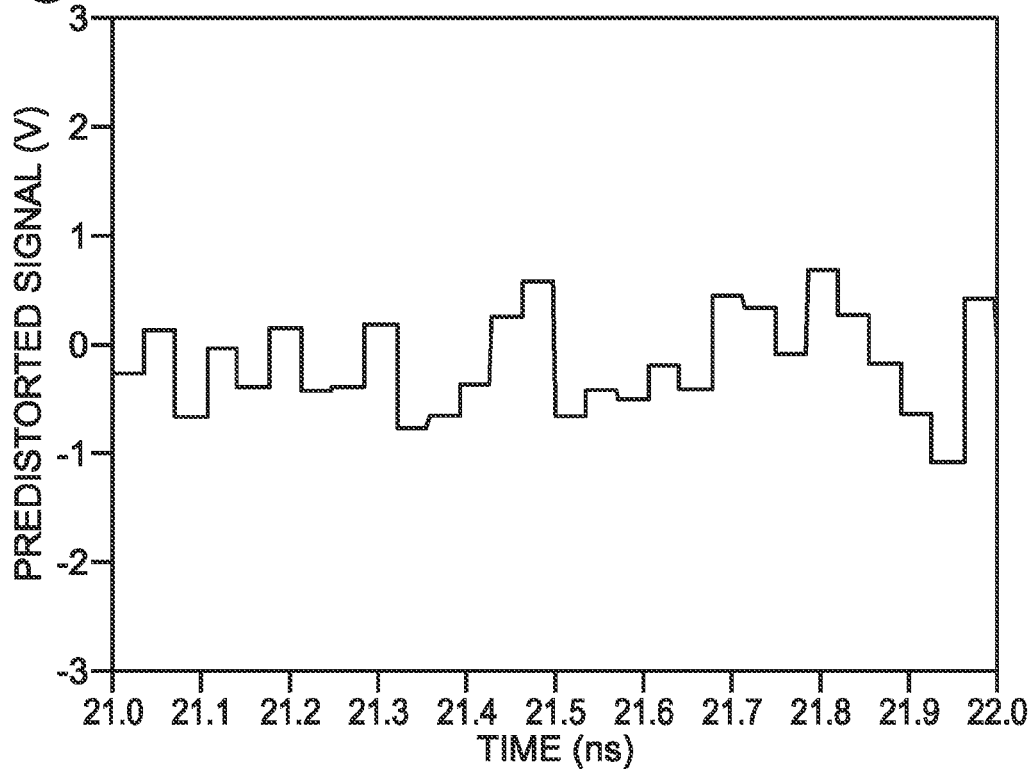

FIGS. 7A and 7B are graphs, respectively, of electrical signals before CD pre-compensation and after DAC conversion. After CD pre-compensation, the electrical signal has a smaller amplitude and a greater number of logic levels, especially at higher modulation levels. To limit distortion in the Mach-Zehnder modulators (MZMs) 112a and 112b (see FIG. 6), pre-distortion compensation may be performed by modules 602a and 602b. For example, the peak-to-average power ratio (PAR) of an unpre-distorted signal would be 0 dB, while the pre-distorted signal has a 9 dB PAR.

Figure 8:
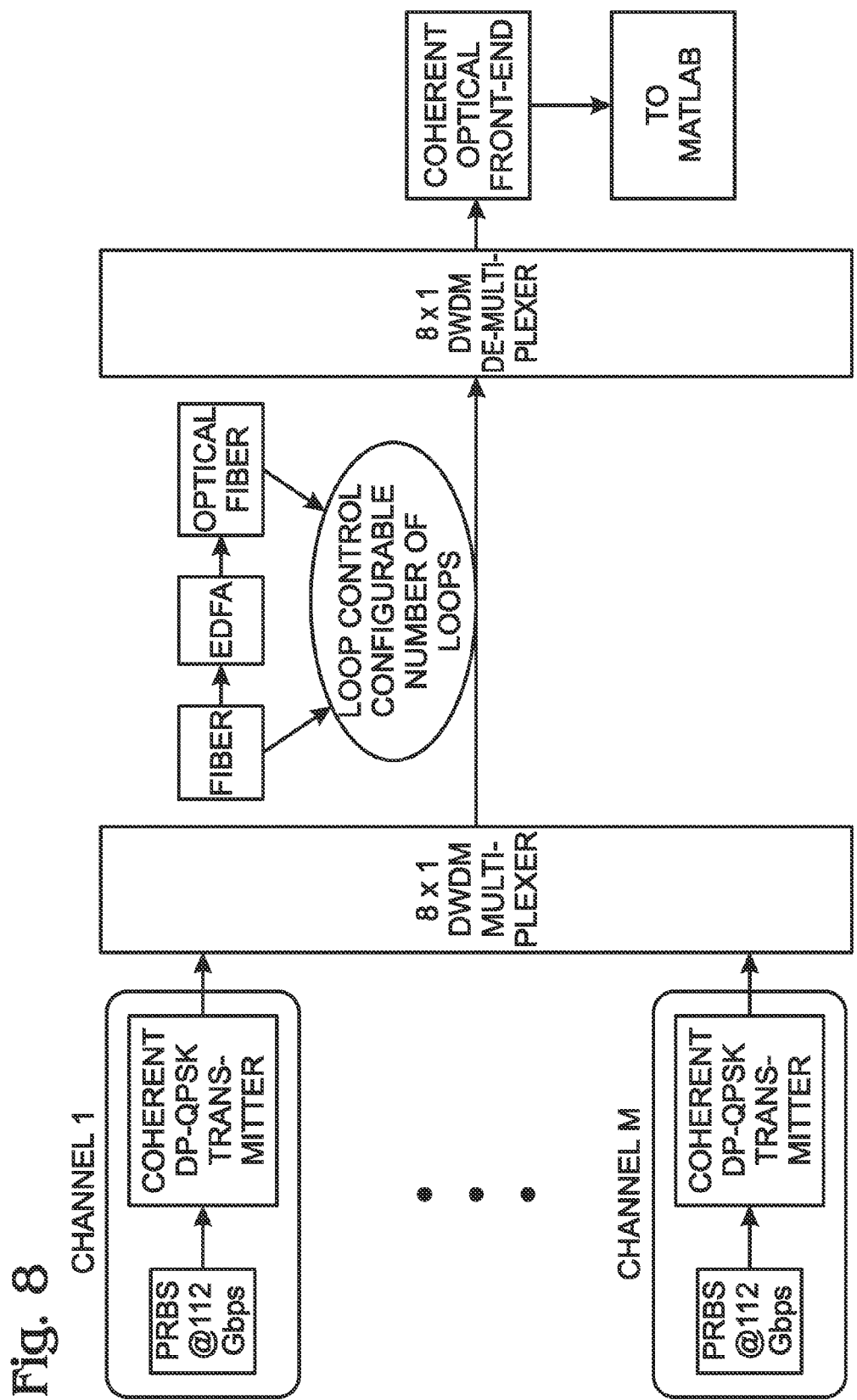
FIG. 8 is a diagram depicting an optical simulation setup.

FIG. 8 is a diagram depicting an optical simulation setup. An OptiSystem™ system simulator, manufactured by Optiwave Inc., was used to model the above-described optical system. Output data at the output of the coherent optical front-end was stored in Matlab™ at 6× oversampling for further processing. The system used 8 (M=8) channels, with DP-QPSK transmitters supplying a pseudorandom binary sequence (PRBS) at 112 gigabits per second (Gbps). The channels were spaced 50 gigahertz (GHz) apart from 193.25 terahertz (THz) to 193.6 THz. The 8 channels were presented to a dense wavelength division multiplexer (DWDM). The fiber used was 0.2 dB/km attenuation 16.75 ps/nm km. After presentation to a 8×1 DWDM demultiplexer (spaced 50 GHz apart from 193.25 THz to 193.6 THz), the optical signals were fed to a coherent optical front end.

Figure 10:
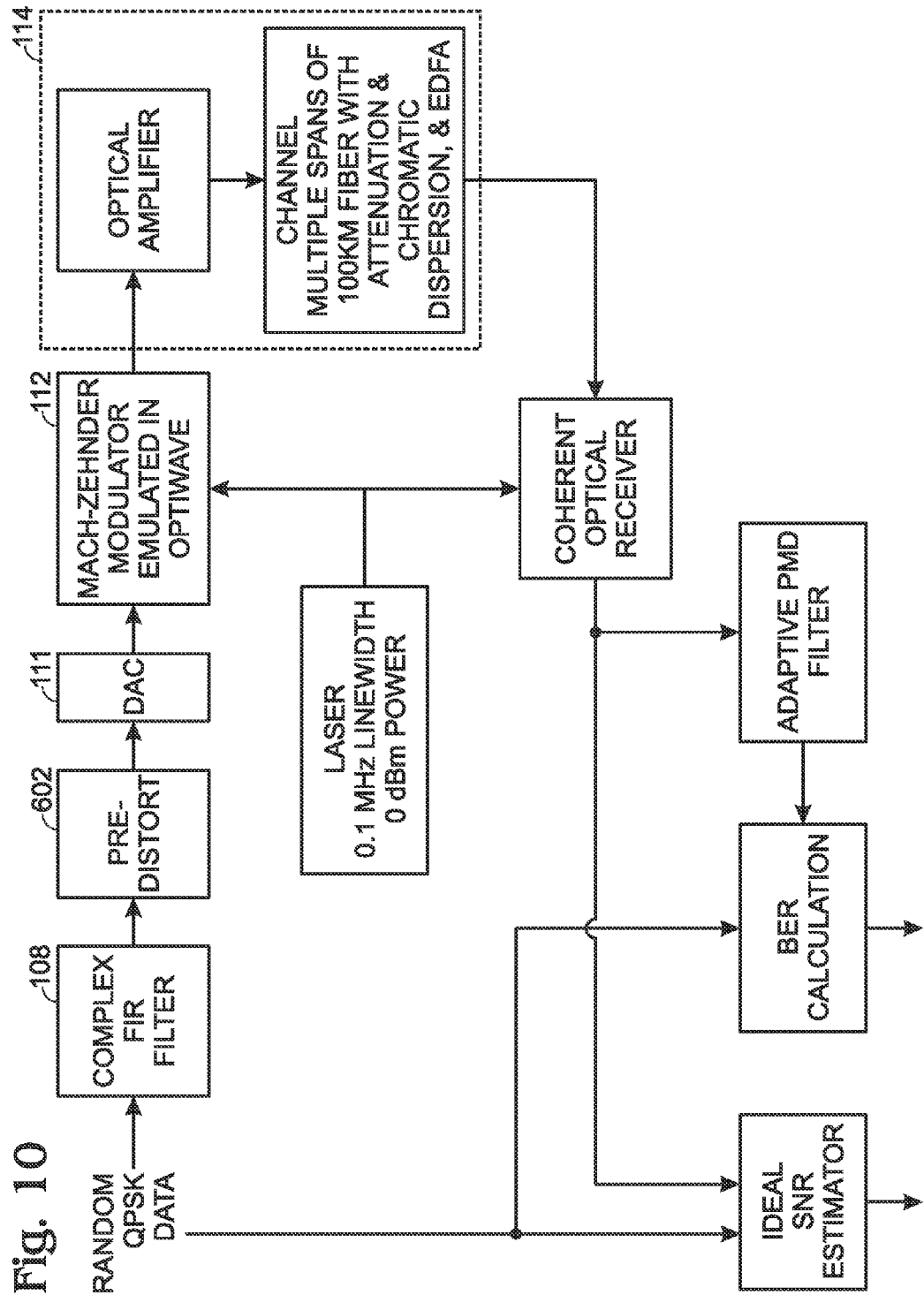
FIG. 10 depicts the setup used to perform tests 1-4 listed in the chart of FIG. 9.

FIG. 9 is a chart listing some results from tests performed using the simulation set up of FIGS. 8 and 10. The precompensation filter length varied from 13 taps at 500 km, to 639 taps at 5000 km. The transmit signal chain must be designed to ensure that the pre-distorted signal is preserved through the DAC, driver and optical modulator. Two aspects are critical: first, the DAC input signal should have sufficient backoff to preserve the signal linearity, given the high peak-to-average power ratio (PAPR) caused by pre-distortion. Secondly, the DAC must have sufficient precision to accurately represent the pre-distorted signal. In a test setup with a fixed fiber length of 100 km, with PMD and non-linearity effects off, with the receive and transmit lasers locked, and PAR (backoff) of 10 dB, a 6-bit DAC was sufficient to maintain the same performance as an ideal infinite-precision DAC. Similar results were observed at a length of 4000 km as well.

FIG. 10 depicts the setup used to perform tests 1-4 listed in the chart of FIG. 9. Random QPSK data was fed to a CD pre-compensation filter 108, enabled as a complex finite impulse response (FIR) filter, parameterized by total dispersion picoseconds/nanometers (ps/nm). After pre-compensation, the data was passed to pre-distortion module 602, normalized to 3 V peak-to-peak, clipped at 10 dB above rms, and DAC 111 for quantization at the desired number of bits. The Mach-Zehnder modulator 112 was emulated in software, with the channel and optical front-end components shown in FIG. 8. The adaptive PMD filter cleans up residual intersymbol interference (ISI), and BER and SNR calculations can be compared to the original QPSK signal. It should be noted that in this setup no CD compensation is performed in the receiver. Rather, CD pre-compensation has been performed in the transmitter.

Figure 11:
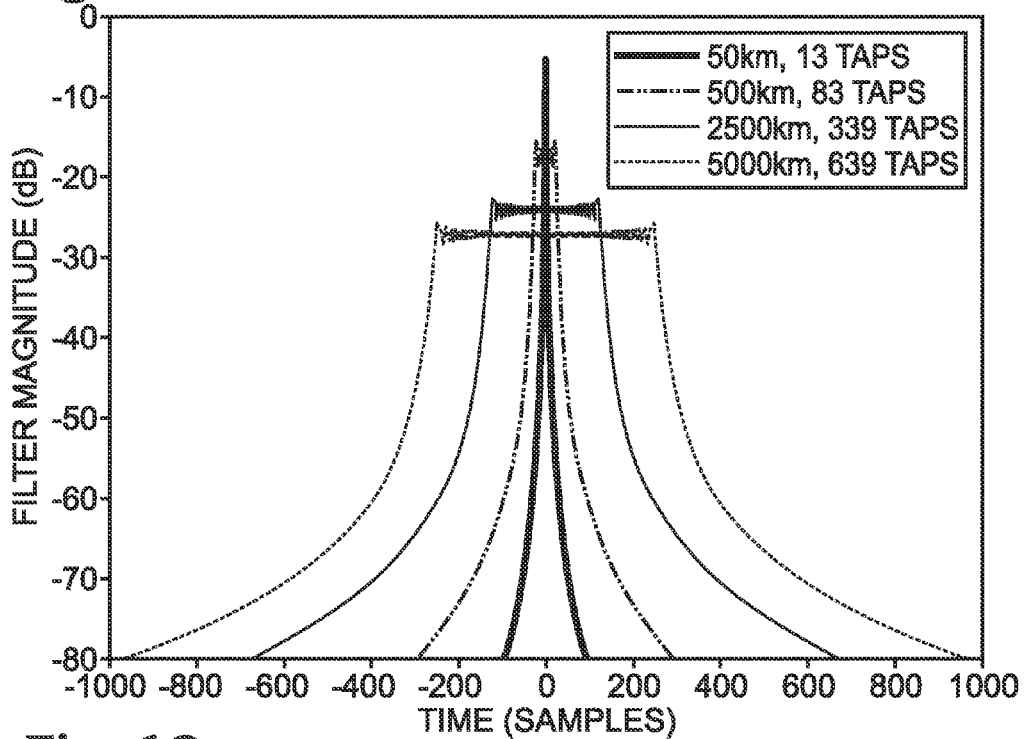
FIG. 11 is a graph depicting the relationship between fiber length and filter length (number of filter taps).

FIG. 11 is a graph depicting the relationship between fiber length and filter length (number of filter taps). The required number of taps increases with the length of the fiber.

Figure 12:
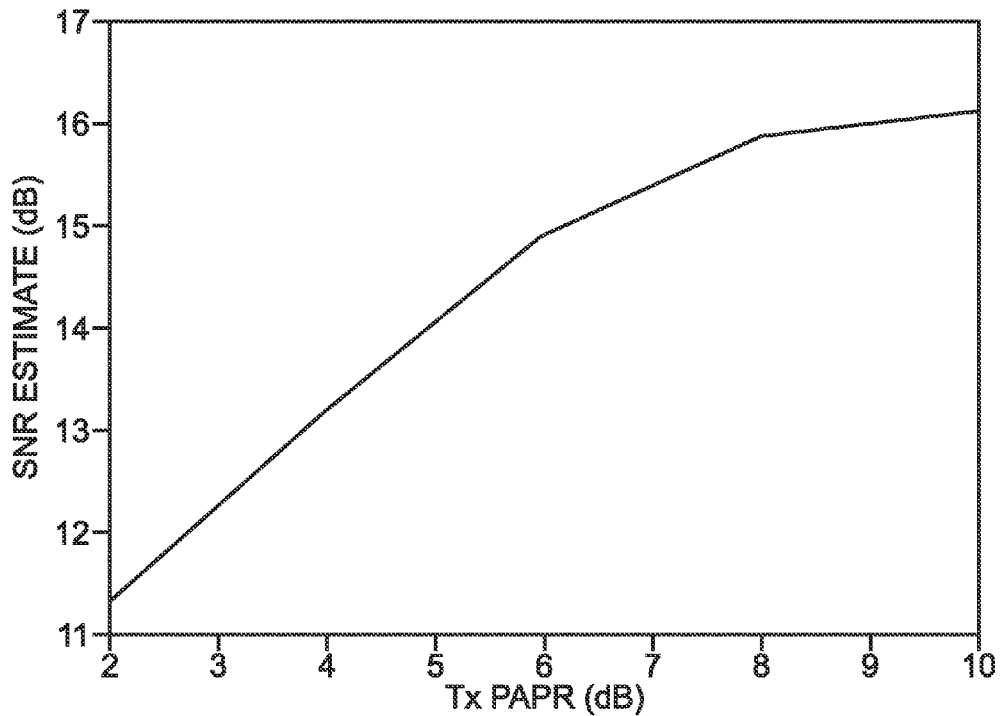
FIG. 12 is a graph illustrating the dependence of SNR on the transmitter clipping level.

FIG. 12 is a graph illustrating the dependence of SNR on the transmitter clipping level. To measure SNR, the received signal was compared to a known transmit signal. PMD and fiber non-linearities were turned off, and the transmitter and receiver local oscillators (LOs) were locked. At low clipping levels, the signal is distorted, reducing the receive SNR. Good receiver performance (SNR >16 dB) occurs at a PAR of 10 dB, which agrees with well-known theoretical results.

Figure 13:
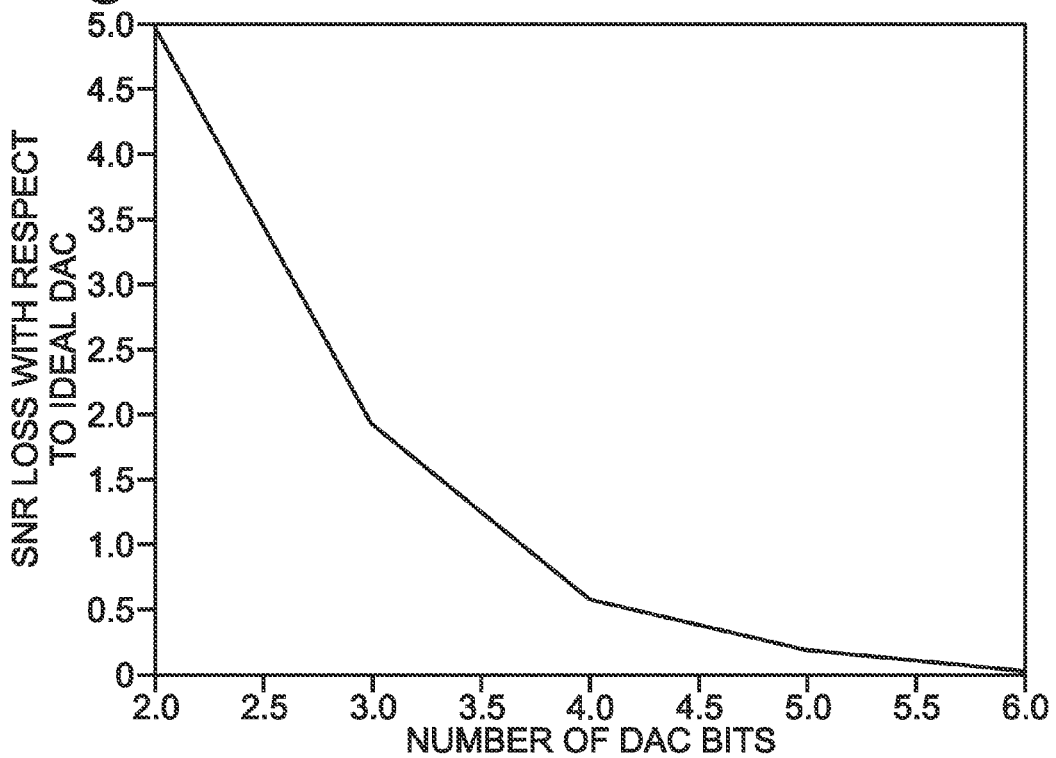
FIG. 13 is a graph illustrating the relationship between SNR and the number of DAC bits.

FIG. 13 is a graph illustrating the relationship between SNR and the number of DAC bits. To measure SNR, the received signal was compared to known transmit signal. To focus on transmitter effects, PMD and fiber non-linearities were turned off, and the receiver LO was phase-locked to the transmit LO. The signal level was 0.5V rms and the clipping threshold was 10 dB. Adequate precision was obtained with 5-6 bits. However, 4-bit precision may be adequate with an additional reduction in PAR.

Figure 14:
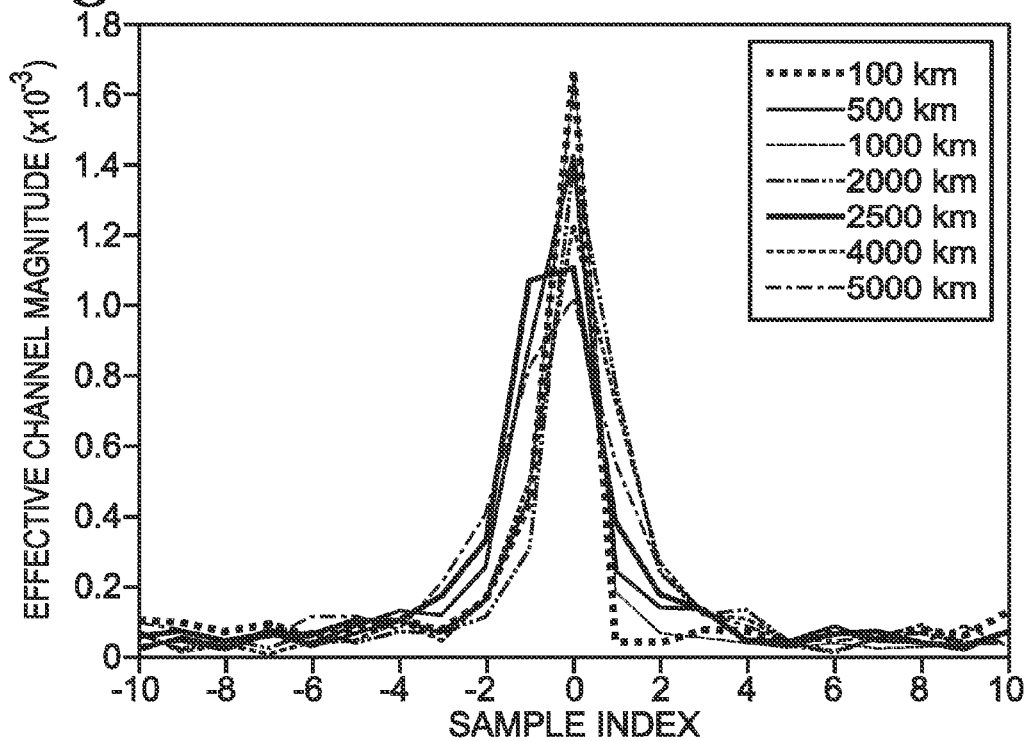
FIG. 14 is a graph depicting effective channel length after pre-compensation.

FIG. 14 is a graph depicting effective channel length after pre-compensation. The effective channel at the receiver after transport through various lengths of fiber is nearly an impulse for all distances. The results show that transmitter pre-equalization is effective when the fiber lengths are known.

In summary, simulations show that the transmit signal level should be 0.5 V rms or less, with ~10 dB PAR, which has to be accounted for in DAC headroom. The total DAC precision needs to be 5-6 bits.

Figure 15:
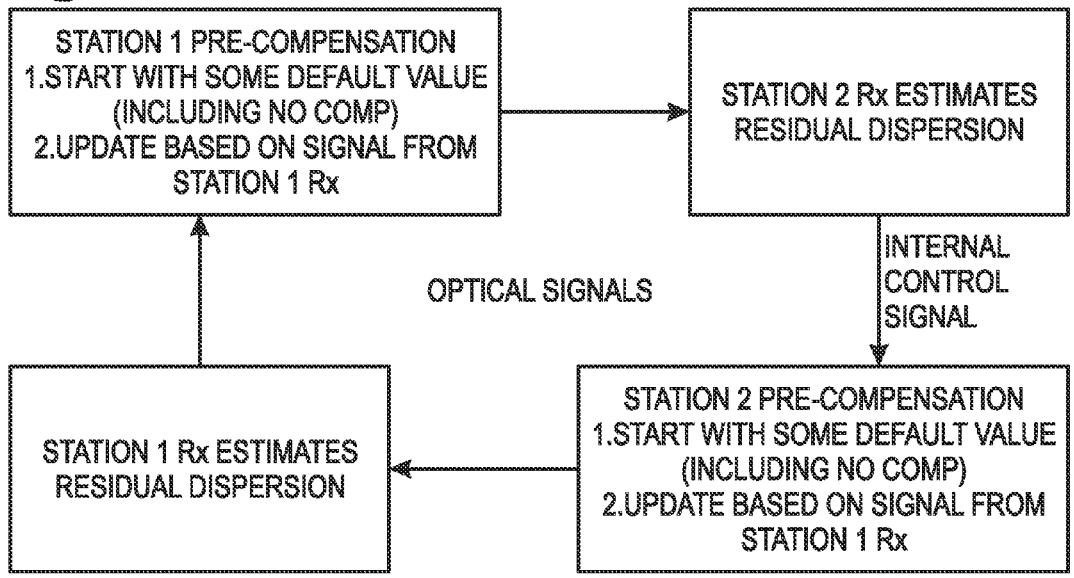
FIG. 15 is block diagram depicting an overview of CD pre-compensation adaptation procedures.

FIG. 15 is block diagram depicting an overview of CD pre-compensation adaptation procedures. All techniques rely on having some form of bi-directional link. The receiver in one direction feeds information to the co-located transmitter in the receive direction. There are two classes of adaptation techniques. In the reciprocity-based approach, the forward-link receiver feedback is only used locally at the reverse-link transmitter. With the explicit feedback the forward-link receiver feedback signal is explicitly fed back to the forward-link transmitter via the reverse link. The reverse link just acts as conduit for forward link feedback.

Figure 16:
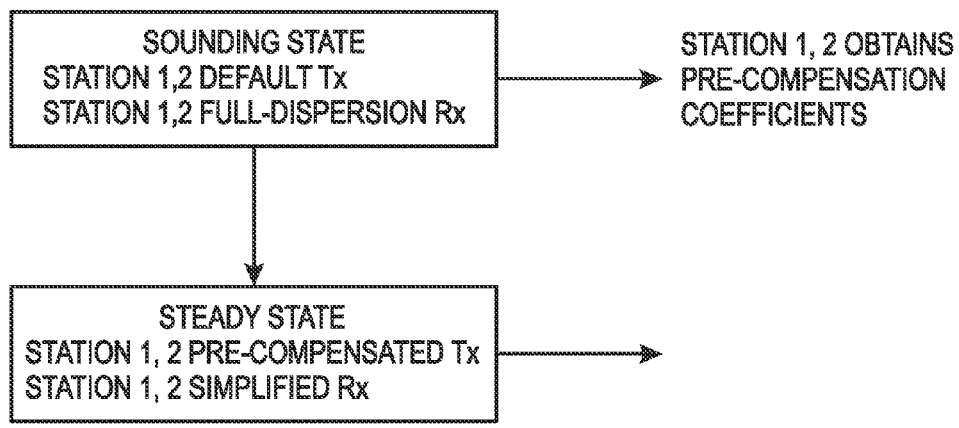
FIG. 16 is a flowchart illustrating the reciprocity-based adaption approach.

FIG. 16 is a flowchart illustrating the reciprocity-based adaption approach. To ensure both stations converge on chromatic dispersion, sequential tracking loops are executed. Both stations initially transmit with (same) default signal, and the receivers use this to estimate receive filter coefficients. Some trigger signal/timing coordination means ensures a transition to steady state. In steady state, the transmitters use pre-compensation, but the receivers are simpler, as CD compensation is not required. The advantage is that no signaling or coordination is required, except for state transition. The disadvantage is that during initial convergence, the receiver has to be able to handle maximum dispersion. Thus, the hardware has to be provisioned for high power consumption even if steady state value if smaller. However, this issue can be avoided in a variant where a known signal is transmitted during sounding state (to enable easy estimation of dispersion). This method does not work well if CD is not symmetric or it changes significantly.

Figure 17:
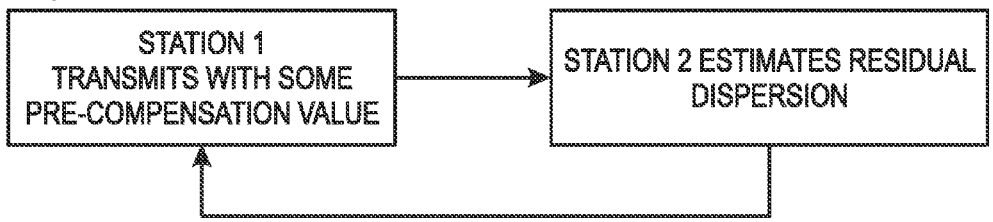
FIG. 17 is a flowchart illustrating the explicit feedback approach.

FIG. 17 is a flowchart illustrating the explicit feedback approach. The feedback link is logical, with the data actually embedded inside reverse link optical signal. The feedback signal indicates the preferred value of pre-compensation or the amount of residual dispersion. This information can be signaled as an adjustment to existing value. The loop continually runs, tracking changes in dispersion. Some advantages are that the system does not require symmetry, and can handle varying degrees of dispersion. The receiver need not be able to handle full dispersion. However, the method requires an explicit signal on feedback link and, therefore, uses a higher layer communication protocol.

FIG. 18 is a flowchart illustrating a method for performing CD pre-compensation. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 2000.

In Step 2002 a transmitter generates a first electronic signal at a transmitter. Step 2004 uses a transmit CD compensation estimate to compute a CD pre-compensation filter. Step 2006 uses the transmit CD pre-compensation filter to process the first electronic signal. Step 2008 generates a pre-compensated first electronic signal. Step 2010 converts the pre-compensated first electronic signal into an optical signal. Step 2012 transmits the optical signal to a first optical receiver via an optical channel.

In one aspect some CD compensation is still performed at the receiver. Thus, Step 2014 may receive the optical signal via the optical channel at the first optical receiver. Step 2016 converts the optical signal into an analog electronic signal. Step 2018 converts the analog electronic signal to a digital signal at an initial sampling frequency $F_1$. Step 2020 resamples the digital signal at a sampling frequency $F_2$, lower in frequency than $F_1$. Step 2022 supplies the resampled digital signal to a CD compensation filter. In Step 2024 the CD compensation filter supplies a CD compensated signal at the $F_2$ sampling frequency. Step 2026 resamples the CD compensated input signal at a sampling frequency $F_3$, greater than or equal to the $F_2$ sampling frequency. Step 2028 uses an adaptive equalizer to process the resampled CD compensated signal to estimate the first electronic signal.

In other aspects a residual dispersion estimate is returned to the transmitter. In this aspect, generating the first electronic signal in Step 2002 includes generating a test (e.g., predetermined) electronic signal. Generating the CD compensation estimate in Step 2004 includes using a first dispersion value to compute a first CD compensation filter, and Step 2012 transmits a test optical signal. In Step 2030 the transmitter accepts a residual dispersion estimate of the test optical signal from a first optical receiver CD compensation filter, generated from a CD estimate. Then, using the transmit CD estimate in Step 2004 includes modifying the CD compensation estimate in response to the combination of the first dispersion value and residual dispersion estimate.

In a different aspect the receiver does not need to perform any CD compensation. Thus, Step 2014 receives the optical signal via the optical channel at the first optical receiver. Step 2034 converts the optical signal into an analog electronic signal. Step 2036 uses an adaptive equalizer to process the analog electronic signal, to estimate the first electronic signal.

In another aspect, in Step 2038 a second optical receiver receives a test optical signal via a reverse optical channel, having about the same length as the optical channel. The second optical receiver is local to the transmitter, or connected to the transmitter via some means. Then, using the CD compensation estimate in Step 2004 includes substeps. Step 2004*a* generates a reverse CD estimate for the reverse optical channel in response to the received test optical signal. Step 2004*b* uses the reverse CD estimate to obtain the CD compensation estimate. For example, the CD compensation estimate is initialized, replaced, or modified using the reverse CD estimate.

In one aspect, computing the transmit CD pre-compensation filter in Step 2006 includes calculating a zero-forcing filter with the number of taps (n) required to nullify an estimated CD frequency response of the optical channel, and using one of the following filter mechanisms: tap values represented by a finite quantization set, or a truncated number of taps (n–x), where x is an integer greater than 0.

For example, Step 2006 may calculate the zero-forcing filter using the following substeps. Step 2006*a* partitions the chromatic dispersion frequency response of the optical channel into a plurality of constituent chromatic dispersion responses. Step 2006*b* calculates a zero-forcing filter corresponding to each of the plurality of constituent chromatic dispersion responses. Step 2006*c* truncates the number of taps in each of the plurality of zero-forcing filters. Step 2006*d* forms a CD pre-compensation filter for each of the plurality of truncated tap zero-forcing filters. Step 2006*e* cascades the plurality of CD pre-compensation filters.

Alternatively, Steps 2006*a* through 2006*b* are performed, as above, and Step 2006*f* forms a CD pre-compensation filter using the quantized set of tap values for each of the plurality of zero-forcing filters. Step 2006*e* cascades the plurality of CD pre-compensation filters.

A system and method have been provided for CD pre-compensation. Examples of adaption mechanisms, zero-forcing functions, truncated tap numbers, quantization values, and sampling rates have been presented to illustrate the invention. However, the invention is not limited to merely these examples. Other variations and embodiments of the invention will occur to those skilled in the art.

I claim:

1. A method for performing chromatic dispersion (CD) pre-compensation, the method comprising:
 a transmitter generating a first electronic signal at the transmitter;
 using a transmit CD compensation estimate to compute a CD pre-compensation filter;
 using the transmit CD pre-compensation filter to process the first electronic signal;
 generating a pre-compensated first electronic signal;
 converting the pre-compensated first electronic signal into an optical signal;
 transmitting the optical signal to a first optical receiver via an optical channel at the first optical receiver;
 generating, based on the optical signal, a digital signal;
 sampling the digital signal at an initial sampling frequency F1;
 sampling the digital signal at a sampling frequency F2, lower in frequency than F1;
 supplying the resampled digital signal to a CD compensation filter, the CD compensated filter supplying a CD compensated signal at the F2 sampling frequency;
 resampling the CD compensated signal at a sampling frequency F3, greater than or equal to the F2 sampling frequency; and
 using an adaptive equalizer to process the CD compensated signal resampled at the sampling frequency F3 to estimate the first electronic signal.

2. The method of claim 1 further comprising:
 receiving the optical signal via the optical channel at the first optical receiver; and,
 wherein generating the digital signal comprises converting the optical signal into an analog electronic signal, and converting the analog electronic signal to the digital signal at the initial sampling frequency F1.

3. The method of claim 1 wherein generating the first electronic signal includes generating a test electronic signal;
 wherein generating the CD compensation estimate includes using a first dispersion value to compute a first CD compensation filter;
 wherein transmitting the optical signal includes transmitting a test optical signal;
 the method further comprising:
  the transmitter accepting a residual dispersion estimate of the test optical signal from a first optical receiver CD compensation filter, generated from a CD estimate; and,
  wherein using the transmit CD estimate includes modifying the CD compensation estimate in response to the combination of the first dispersion value and residual dispersion estimate.

4. The method of claim 1 further comprising:
converting the pre-compensated first electronic signal into the optical signal further comprising, converting the pre-compensated first electronic signal an analog electronic signal; and,
using the adaptive equalizer to process the analog electronic signal to estimate the first electronic signal.

5. The method of claim 1 further comprising:
a second optical receiver receiving a test optical signal via a reverse optical channel, having about the same length as the optical channel;
wherein using the CD compensation estimate includes:
generating a reverse CD estimate for the reverse optical channel in response to the received test optical signal; and,
using the reverse CD estimate to obtain the CD compensation estimate.

6. The method of claim 1 wherein computing the transmit CD pre-compensation filter includes calculating a zero-forcing filter with a number of taps (n) required to nullify an estimated CD frequency response of the optical channel, and using a filter mechanism selected from a group consisting of using tap values represented by a finite quantization set and using a truncated number of taps (n–x), where x is an integer greater than 0.

7. The method of claim 6 wherein calculating the zero-forcing filter includes:
partitioning the chromatic dispersion frequency response of the optical channel into a plurality of constituent chromatic dispersion responses;
calculating a zero-forcing filter corresponding to each of the plurality of constituent chromatic dispersion responses; forming a CD pre-compensation filter using the quantized set of tap values for each of the plurality of zero-forcing filters; and,
cascading the plurality of CD pre-compensation filters.

8. In a first optical transmitter, a system for performing chromatic dispersion (CD) pre-compensation, the system comprising:
a transmit modulator having an output to supply a first electronic signal;
a transmit CD pre-compensation filter, built from a CD compensation estimate, and having an input to accept the first electronic signal, the transmit CD pre-compensation filter processing the first electronic signal and supplying a pre-compensated first electronic signal at an output; and
a transmit optical module having an input to accept the pre-compensated first electronic signal and an output for transmitting the optical signal to a first optical receiver via an optical channel,
wherein the transmit CD pre-compensation filter is built using a CD compensation estimate that partitions a chromatic dispersion frequency response of the optical channel into a plurality of constituent chromatic dispersion responses, calculates a plurality of zero-forcing filter corresponding to each of the plurality of constituent chromatic dispersion responses, forms a CD pre-compensation filter using a finite quantized set of tap values for each of a plurality of zero-forcing filters, and cascades the plurality of CD pre-compensation filters.

9. The system of claim 8 wherein the transmit modulator supplies a test electronic signal;
wherein the transmit CD pre-compensation filter uses a first dispersion value as the CD compensation estimate and supplies a test electronic signal compensated with the first dispersion value;
wherein the transmit optical module transmits a test optical signal to the first optical receiver; and,
wherein the transmit CD pre-compensation filter receives a residual dispersion estimate from the first optical receiver and modifies the CD compensation estimate in response to the combination of the first dispersion value and residual dispersion estimate.

10. The system of claim 8 further comprising:
a second optical receiver comprising:
a receive optical module accepting a test optical signal from a second optical transmitter via a reverse optical channel, and
having an output to supply a received test electronic signal;
a receiver CD compensation filter accepting the received test electronic signal, and having an output to supply a reverse CD estimate for the reverse optical channel; and,
wherein the transmit CD pre-compensation filter is built using a CD estimate responsive to the reverse CD estimate.

11. The system of claim 8 wherein the transmit CD pre-compensation filter is built using the CD estimate that calculates a zero-forcing filter of the plurality of zero-forcing filters with a number of taps (n) required to nullify an estimated CD frequency response of the optical channel, and uses a filter mechanism selected from a group consisting of using tap values represented by the finite quantization set of tap values and using a truncated number of taps (n–x), where x is an integer greater than 0.

12. The system of claim 8, wherein the first optical receiver converts the optical signal to an electronic signal having an initial sampling frequency, and further comprising:
a first sampling device that samples the electronic signal at one or more intermediate sampling frequencies;
a CD compensation filter that generates a CD compensated signal at the one or more intermediate sampling frequencies; and
an adaptive equalizer that processes the CD compensated signal at the one or more intermediate sampling frequencies to estimate the first electronic signal.

13. In an optical network, a system for performing chromatic dispersion (CD) pre-compensation, the system comprising:
an optical transmitter comprising:
a transmit modulator having an output to supply a first electronic signal;
a transmit CD pre-compensation filter, built from a CD compensation estimate, having an input to accept the first electronic signal, the transmit CD pre-compensation filter processing the first electronic signal and supplying a pre-compensated first electronic signal at an output;
a transmit optical module having an input to accept the pre-compensated first electronic signal and an output for transmitting the optical signal to an optical receiver via an optical channel;
the optical receiver comprising:
a receive optical module having an input to accept the optical signal and an output to supply an analog electronic signal converted from the optical signal;
an analog-to-digital converter (ADC) having an input to accept the analog electronic signal and an output to supply a digital signal at an initial sampling frequency F1;

a first sampler having an input to accept the digital signal and an output to supply the digital signal resampled at a sampling frequency F2, lower in frequency than F1;

a CD compensation filter having an input to accept the digital signal resampled at sampling frequency F2, and supplying a CD compensated signal at the F2 sampling frequency;

a second sampler having an input to accept the CD compensated signal and an output to supply a CD compensated input signal resampled at a sampling frequency F3, greater than or equal to the F2 sampling frequency; and, an adaptive equalizer having an input to accept the CD compensated signal resampled at the sampling frequency F3, and an output to supply an estimate of the first electronic signal.

* * * * *